US006063478A

United States Patent [19]

Schaupert et al.

[11] Patent Number: 6,063,478

[45] Date of Patent: May 16, 2000

[54] TRANSPORT SHIELD, ASSEMBLY AID AND OPERATING MEANS FOR GLASS CERAMIC PANELS

[75] Inventors: Kurt Schaupert, Hofheim; Herwig Scheidler, Mainz, both of Germany

[73] Assignee: Schott Glaswerke, Mainz, Germany

[21] Appl. No.: 08/511,525

[22] Filed: Aug. 4, 1995

Related U.S. Application Data

[63] Continuation of application No. 08/225,069, Apr. 8, 1994, abandoned.

[30] Foreign Application Priority Data

Apr. 8, 1993 [DE] Germany ............................ 43 11 758

[51] Int. Cl.[7] ...................................................... B32B 9/00

[52] U.S. Cl. ......................... 428/192; 428/161; 428/34.4; 414/789.5

[58] Field of Search ......................... 156/522; 414/789.5; 428/192, 688, 34.4, 161; 219/464

[56] References Cited

U.S. PATENT DOCUMENTS

| | | | |
|---|---|---|---|
| 3,133,853 | 5/1964 | Know | 428/161 |
| 3,567,906 | 3/1971 | Hurko | 126/211 |
| 3,903,669 | 9/1975 | Pease, Jr. et al. | 52/455 |
| 3,978,633 | 9/1976 | Scheidler et al. . | |
| 4,243,016 | 1/1981 | Kristen et al. | 126/211 |
| 4,743,336 | 5/1988 | White | 156/522 |
| 4,775,570 | 10/1988 | Ohlenforst et al. | 428/192 |
| 4,863,340 | 9/1989 | Masunaga et al. | 414/789.5 |
| 4,916,873 | 4/1990 | Keys | 52/208 |
| 5,158,638 | 10/1992 | Osanami et al. | 156/245 |

FOREIGN PATENT DOCUMENTS

| | | |
|---|---|---|
| 74 01 645 | 1/1974 | Germany . |
| 90 00 733 | 5/1990 | Germany . |
| 41 03 664 C1 | 1/1992 | Germany . |

*Primary Examiner*—Patrick Ryan
*Assistant Examiner*—Patrick Jewik
*Attorney, Agent, or Firm*—Millen, White, Zelano & Branigan, P.C.

[57] ABSTRACT

A transport shield is provided for brittle glass and glass ceramic panels susceptible to scratching and fracturing to be integrated into a cooker, in particular as cooking surfaces. The transport shield remains permanently joined to the panel during installation, assembly and operation and is formed to act as a protector during mounting, a positioning aid, a separator, an elongation compensating medium and/or a sealing member and/or an inspection window in profiled panels.

3 Claims, 2 Drawing Sheets

TRANSPORT SHIELD, ASSEMBLY AID AND OPERATING MEANS FOR GLASS CERAMIC PANELS

This application is a continuation of application Ser. No. 08/225,069, filed Apr. 8, 1994 now abandoned.

FIELD OF THE INVENTION

The invention concerns a transport shield for brittle glass and glass ceramic panels susceptible to scratching and fracturing to be integrated into a cooker, in particular as cooking surfaces.

BACKGROUND OF THE INVENTION

During transport, the surfaces and edges of glass and glass ceramic panels must be shielded against mutual contact and contact with hard objects, since scratches substantially diminish their resilience to shock and bending.

For example, glass ceramic panels typically sized from 20×40 cm to 50×100 cm are transported in reusable boxes containing app. 150 pieces each, with the panels standing upright. Mutual contact of the panels is thereby prevented in that air cushion foils—so-called "burled" foils—or cardboard strips are interposed. The air cushion foil covers the panel surface completely, while the cardboard strips only cover app. 10–20% of the surface.

In both cases, a relatively large amount of material which has to be disposed of is left after unpacking. Recycling of the air cushion foil is uneconomical, due to its high transport volume, the variety of its external forms and the low cost of the new product.

Detachable synthetic jambs present a further option, but they must be elaborately secured against displacement and are barely usable with panels with larger, extended radii.

However, due to their low volume and usability with all panels not having radii, synthetic jambs are reusable.

A transport rack for glass panels is known from the DE 41 29 058 C1, comprising a warp-resistant base, wherein horizontal mounting ledges for upright arrangement of the glass panels and clamping means acting upon the upper edges of the erect glass panels are provided, whereby rows of orthogonal support rods forming slide-in compartments for individual glass panels to be inserted from above are arranged on the base and a slider-shaped holding member is spring-fastened to each support rod in such manner that under initial stress it is also attachable to the upper edge of the glass panel inserted in the slide-in compartment associated with the respective support rod.

The manufacture of the transport rack according to DE 41 29 058 is costly, and the rack is relatively fragile due to its many moving parts.

During installation and assembly of the glass ceramic panels, e.g., in the frame of the cooking range, it is vital to ensure that the panel is deposited flexibly and free of tension. For this purpose, separators are glued into the frame prior to deposition of the panel.

These separators are foam material strips of 1 to 2 mm thickness having a surface dimension of app. 5x10 mm, which are adhesive on one or both sides and of sufficient temperature stability. Two or three separators are applied to each side of the frame, whereby attention must be given to complete and precise positioning of the separators, since contact between the panel and the frame can cause damage resulting in a reduction of the firmness of the panel. In addition, a permanent elastic connection between the glass ceramic panel and the enclosing frame is needed to achieve the following:

- stress-free mounting of the cooking surface in the enclosing frame;
- sealing of the upper side of the cooking surface against seepage of liquid into the space underneath containing live electrical components; and
- compensation of the elongation differences resulting from the differential thermal expansion of the frame material and the cooking surface during use.

This is presently achieved by appropriate positioning of the panel in the frame and by filling the gap with silicon adhesive.

The invention proceeds from the problem of providing an economic solution for safe and waste-avoiding transport and easy assembly, which also meets further safety requirements by providing, e.g., an inspection window for visual displays and safe-use indicators, for example, of water tightness, as well as providing for easy cleaning of the glass or glass ceramic panels integrated in the cooking range.

The problem is solved according to the present invention in that the transport shield remains permanently connected to the panel after transport, i.e., during installation, assembly and use. The transport shield is thereby usefully constructed to act as a protector during assembly, a positioning aid, a separator, an elongation compensating medium and/or a sealing member.

In a further embodiment, the transport shield provides an inspection window having a smooth surface facing outwards, in particular in profiled panels, by means of filling the profile, e.g., with a transport material (DE 41 04 983 C1).

In a preferred embodiment, the transport shield is glued to the panel, whereby the transport shield consists of permanently elastic compounds containing silicon, in particular silicon rubber and/or silicon resins and/or age-hardening or thermoplastic synthetic resins.

To ensure easy application, organic materials, i.e., synthetic resins, are preferred. Age-hardening synthetic resins, which are applied in highly viscous state and which form smooth surfaces due to their surface tension, are particularly suitable. A large variety of such age-hardening synthetic resins is commercially available. Epoxy resins, silicon resins, furan resins, polyester resins, acrylic resins or polyurethane resins are particularly suitable. Thermoplastic resins which also possess good transparency, such as, e.g., polyvinyl chloride, polystyrene and polyester, in particular acrylic resins, and polycarbonates as well as polyvinyl acetates and acetals are also suitable. In softened state, these thermoplastic materials can be pressed onto the heated or unheated panel with suitable implements or, according to a preferred embodiment, applied to the panel by means of spraying.

The transport shield according to the invention is connected to the panel particularly in the panel portions not subject to heating during use, thus ensuring that the organic compounds used are never brought to the limit of their temperature stability.

According to the invention, the transport shield is applied to one side of the panel, the bottom side.

The transport shield is thereby preferably arranged in the rim or edge area of the panel and can thus form an elastic cushion around its circumference protecting the panel against damage.

Due to the good level formation of the panels, a very small thickness of the transport shield in the range of 0.2 to 4 mm, in particular 1 to 2 mm, is sufficient to prevent damage during transport. Since the transport shield "cushions" are firmly connected to the panel and panels forming one batch are of identical dimension, small cushions of app. 5x5 mm to 10×10 mm are sufficient for reliable prevent of panel damage. The transport shield according to the invention may also be detachably connected to the panel, which is particularly advantageous when the panel is disassembled from the cooker and the operating and auxiliary means are to be removed, e.g., to recycle the panels.

Furthermore, it is also conceivable to connect the transport shield "cushions" detachably to the panel, if they are, e.g., also to be applied to the upper surface of the panel.

The invention also concerns means resp. auxiliary means for installation, assembly and operation of a glass or glass ceramic panel to be integrated in a cooking range as a cooking surface and/or means for forming an inspection window in a profiled panel, if said means resp. auxiliary means are permanently joined to the panel as a transport shield prior to preparing the panel for transport.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
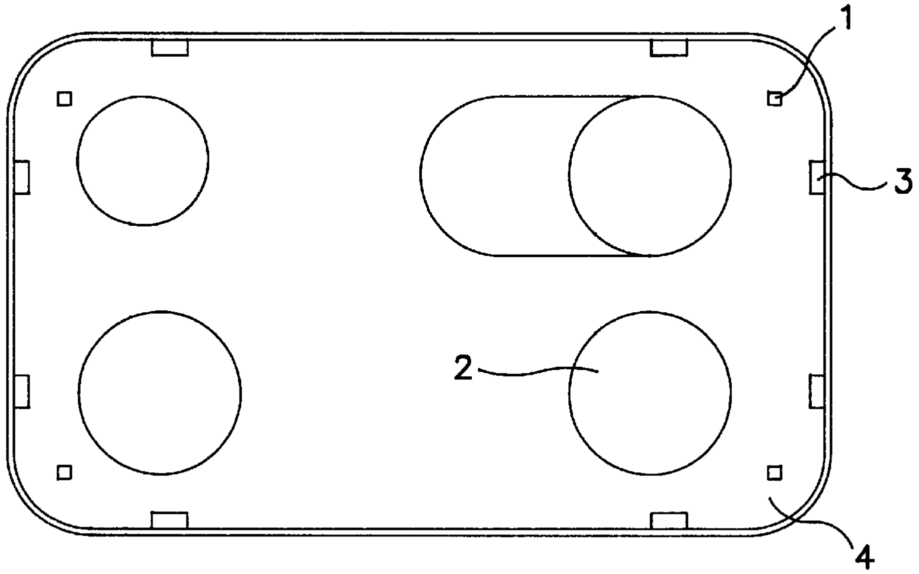
FIG. 1 is a plan view of a glass ceramic panel according to the invention, wherein the transport shield is already applied to the panel.

FIG. 1 shows a commercially available 45×75 cm CERAN® glass ceramic panel (4) having cooking surface zones (2) indicated in the decor of the panel, for installation in a cooker. In the cold area of the cooking range, i.e., outside the cooking surface zones (2), silicone cushions (1) and (3) are applied as transport shields.

The cushions are formed by means of spraying on of the nontransparent silicon adhesive later used for mounting or, if required, using transparent material commonly used on flat glass products for areas offering good inspection (DE 41 04 983 C1).

Both materials are suitable due to their adhesive strength and their chemical and thermal stability. Due to the good level formation of the panels, a very small thickness of the cushions in the range of 1 to 2 mm is sufficient to prevent damage during transport where the plates are arranged upright and side by side as is set forth in the "Background of the Invention."

Since the cushions are firmly joined to the panel and the panels respectively possess identical measurements, small cushions of app. 5×5 mm to 10×10 mm are completely sufficient to reliably prevent panel damage.

Figure 2:
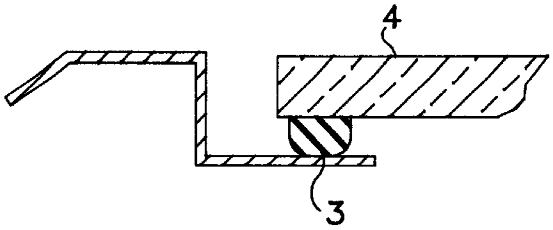
FIG. 2 is a section view through a transport shield "cushion" in the edge area of FIG. 1 during mounting in the frame.

The cushions may be applied on the bottom side of the panel on the surface (1) outside the cooking surface zones (2) or also on the edge (3). In the latter position, they simultaneously act as an undetachable assembly aid, form a shield against the frame and ensure flexible mounting, as shown in FIG. 2.

Figure 3:
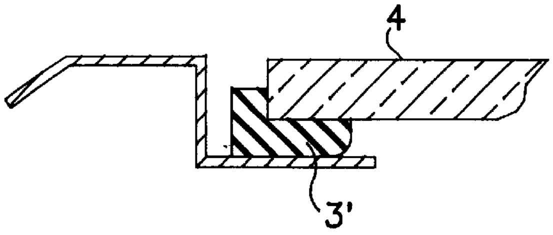
FIG. 3 is a further optional embodiment of the transport shield "cushion" in the edge area with special edge protection in mounting position.

If the cushion is pulled around the edge (3'), as shown in FIG. 3, the required minimum distance is also ensured in lateral direction.

Figure 4:
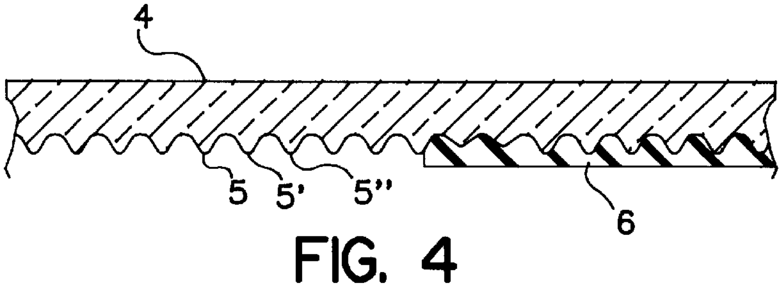
FIG. 4 is a second through a glass ceramic panel having a one-sided profile with a transport shield creating an inspection window.
Figure 5:
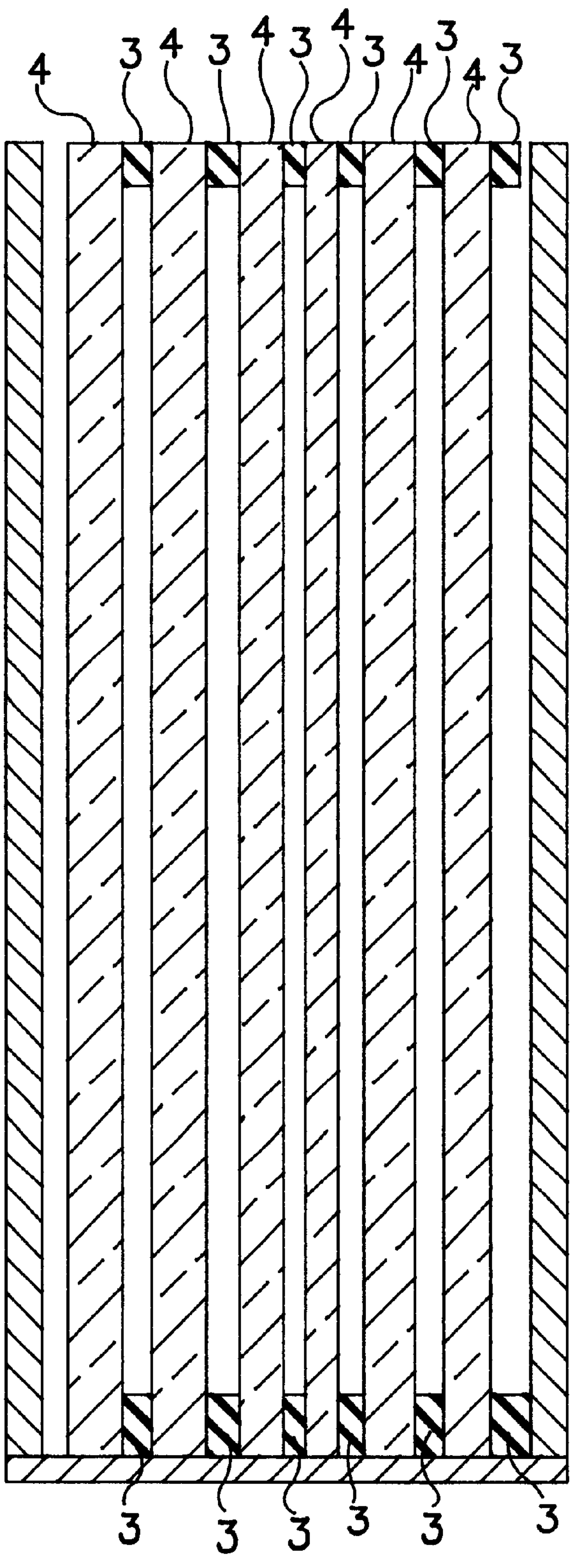
FIG. 5 is a side view of a stack of the glass ceramic panels of FIGS. 1–4.

If further transport shield "cushions" are realized in one operation with a coating applied to the profiled glass, as shown in FIG. 4, to facilitate distortionless inspection, e.g., in the display area, this solution is particularly economical. FIG. 4 shows a glass ceramic panel (4) comprising an, e.g., flute-type profile (5,5',5") defining grooves, etc. The profile is filled with a transparent epoxy resin (6) in a partial area of the panel and thereby forms an inspection window in a diaphanous area.

Since this transport shield is not removed, the problem of packaging material disposal is also eliminated.

The entire disclosures of all applications, patents and publications, cited above and below, and of corresponding application German P 43 11 758.9, filed Apr. 8, 1993, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A cooking apparatus comprising:

a stack of glass ceramic panels, said glass ceramic panels having a fluted profile and cooking surface zones; and cushions selected from the group consisting of silicone and transparent epoxy resin, said cushions being outside the cooking surface zones and arranged to form an inspection window through the glass ceramic panel, said cushions attached to said glass ceramic panel by filling the fluted profile of the glass ceramic panel;

said cooking apparatus capable of being protected against damage during the transportation of the cooking apparatus.

2. The apparatus of claim 1, wherein the stack is comprised of glass ceramic panels in which the panels extent vertically.

3. The apparatus of claim 1, wherein the cushions have a non-adhesive surface for engaging adjacent panels and for engaging a frame when the panels are mounted.

* * * * *